A. WEBER.
TURBINE.
APPLICATION FILED APR. 16, 1914.

1,108,041.

Patented Aug. 18, 1914.

Witnesses:
C. S. Ashley
N. Klein

Inventor
Albert Weber
By his Attorney
Max J. Ordmann

UNITED STATES PATENT OFFICE.

ALBERT WEBER, OF HOBOKEN, NEW JERSEY.

TURBINE.

1,108,041.  Specification of Letters Patent.  Patented Aug. 18, 1914.

Application filed April 16, 1914. Serial No. 832,147.

*To all whom it may concern:*

Be it known that I, ALBERT WEBER, a subject of the German Emperor, residing at Hoboken, in the county of Hudson and State of New Jersey, have invented certain new and useful Improvements in Turbines, of which the following is a specification.

Turbines with oppositely moving members each provided with blades or vanes have been known. But as I am aware the same have proved impracticable because of the difficulty in delivering the driving medium to the moving members.

The object of my invention is to provide a structure obviating said difficulty and increasing the efficiency of the turbine.

With this object in view, my invention consists in the construction, combination and arrangement of parts as hereinafter fully specified and set forth in the annexed claims.

Figure 1:
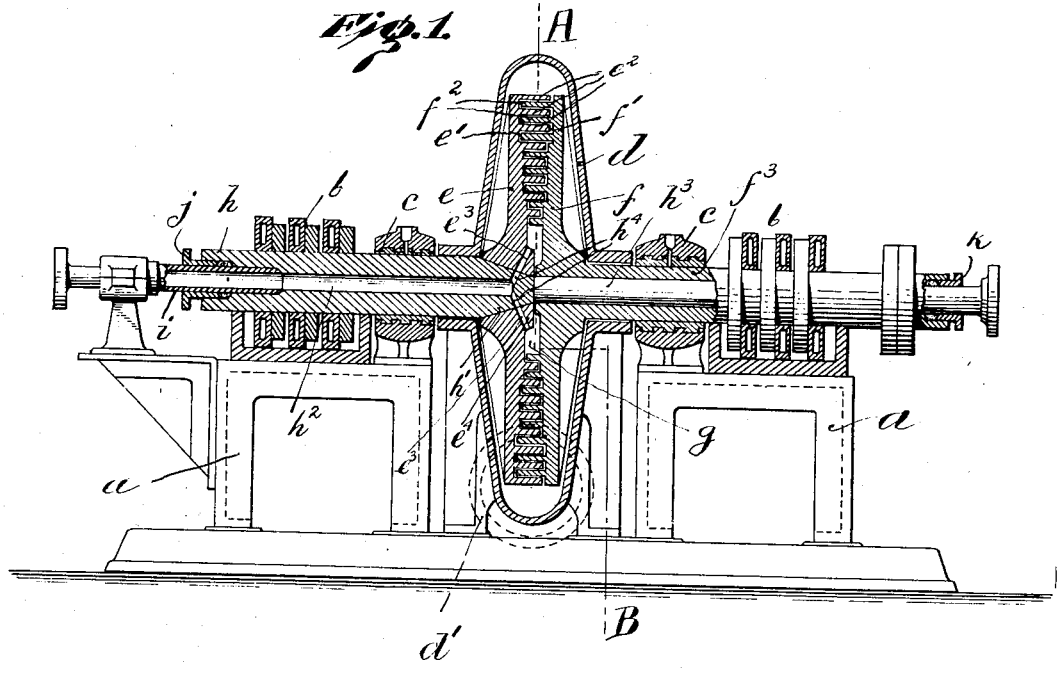
Figure 2:
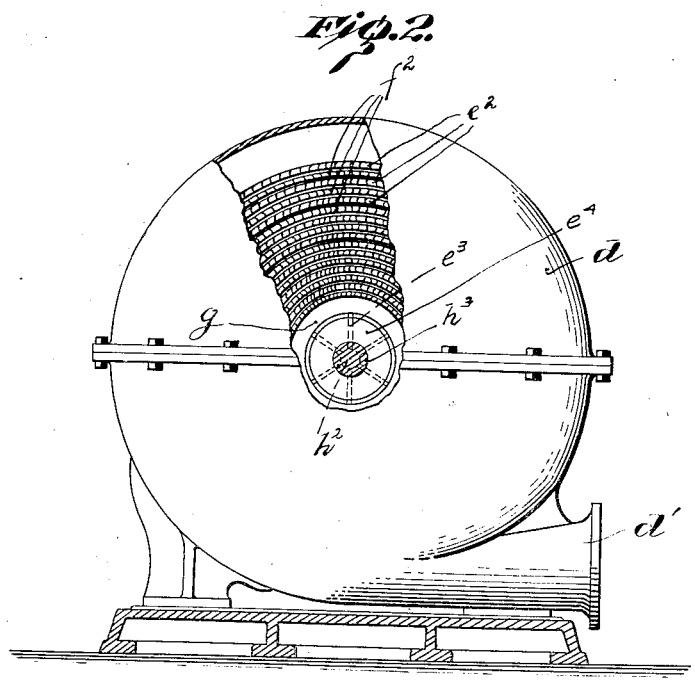

In the accompanying drawing, which forms part of this specification and in which similar reference characters denote corresponding parts, Figure 1 is a longitudinal section of my new turbine and Fig. 2 is a cross section on line A—B of Fig. 1.

Referring specifically to the drawing, $a$ denotes the main frame of the turbine which in the present example is a two-part frame and each part is formed with bearings, $b$, $c$ to receive the shafts of the driven members of the turbine. The bearings $b$ are thrust bearings of any suitable construction. Midway between the two parts of the main frame $a$ casing $d$ is arranged which consists of two horizontally united sections and in which the turbine members are contained. These members consist of two oppositely arranged circular disks $e$, $f$, the inner opposite surfaces $e'$, $f'$ of which slope outwardly and are provided each with annular concentric rows of blades or vanes $e^2$, $f^2$, the free edges of which lie all in a plane and thus owing to the sloping surfaces of the disks are gradually increasing in length toward the circumference of the disk. The blades are curved in the usual manner and those of the disk $e$ interlock with those of the disk $f$ as shown in Fig. 1.

The disk $e$ is fixed on a conical part $h'$ of a shaft $h$ which consists of a hollow part $h^2$ and a reduced solid part $h^3$. The hollow part $h^2$ of the shaft serves as a passage for the driving medium. Into the outer open end of the hollow part $h^2$ projects the delivery pipe $i$, and this end is tightened by a suitable stuffing box $j$. At the inner end the hollow part $h^2$ is provided with a plurality of radial ducts $h^4$, which communicate with the interior of the hollow shaft and lead into ducts $e^3$ formed in the nave portion $e^4$ of the disk $e$ and communicating with the free space $g$ between the two disks and within the inmost ring of vanes or blades. The disk $f$ is provided with a central sleeve or tubular extension $f^3$, which loosely bears on the solid part $h^3$ of the shaft $h$. The hollow part $h^2$ of the shaft $h$ and the tubular extension $f^3$ are supported in the bearings $b$, $c$. The free end of the tubular extension through which the shaft $h^3$ projects is tightly closed by a stuffing box $k$.

The operation of the turbine is as follows: The driving medium enters into the space $g$ from the delivery pipe $i$ through the hollow part $h^2$ of the shaft and the ducts $h^3$ and $e^3$, and acting alternately on the vanes of the disks compel the latter to revolve in opposite direction.

The vane rings must be sufficient in number to consume the velocity of the medium used. As medium steam or other elastic fluid may be used. The structure of the turbine allows of a gradual expansion of the driving medium, as it passes between the interlocking vanes toward the circumference of the disk into the casing $d$. The latter is formed at its bottom with a tubular extension $d'$ for its connection to a condenser (not shown).

The efficiency of the turbine is approximately 90% to 95% as there are no other losses except friction losses in the bearings, etc.

By reasons of the constantly increasing space between the two revolving disks $e$, $f$, the expansive force of the medium will be fully utilized for work.

What I claim and desire to secure by Letters Patent is:

1. An elastic fluid turbine comprising two rotary members having interlocking annular rows of blades or vanes, a hollow shaft communicating with the space between said members and on which one of said members is fixed and the other rotatably mounted, a delivery pipe projecting into the open end of said shaft and a stuffing box in said open end.

2. An elastic fluid turbine comprising two rotary members having interlocking annular rows of blades or vanes, one member having a centrally extended sleeve, a central hollow shaft communicating with the space between said two members and on which said member is rotatably mounted with its sleeve and the other member is fixed, a stuffing box closing the free end of said sleeve, a delivery pipe communicating with said hollow shaft and a stuffing box in the open end of said shaft.

In testimony whereof I affix my signature in presence of two witnesses.

ALBERT WEBER.

Witnesses:
D. KLEIN,
MAX D. ORDMANN.